United States Patent [19]

Laczynski

[11] 4,400,419

[45] Aug. 23, 1983

[54] DECAL ASSEMBLY FOR INSIDE-OUTSIDE APPLICATION HAVING A REFLECTORIZED SURFACE

[76] Inventor: Antoni Laczynski, 3642 W. George St., Chicago, Ill. 60618

[21] Appl. No.: 206,910

[22] Filed: Nov. 14, 1980

[51] Int. Cl.³ .......................... B32B 3/18; B41M 3/12

[52] U.S. Cl. ...................................... 428/40; 156/233; 156/234; 156/235; 156/240; 156/249; 427/147; 428/46; 428/47; 428/78; 428/79; 428/189; 428/191; 428/192; 428/202; 428/203; 428/209; 428/211; 428/513; 428/537; 428/914

[58] Field of Search ............... 156/234, 240, 249, 235, 156/241, 277, 233; 427/148, 147; 428/47, 189, 191, 352, 354, 914, 209, 211, 40-42, 46, 77-79, 192, 194, 195, 202-204, 513, 537

[56] References Cited

U.S. PATENT DOCUMENTS 3,014,828 12/1961 Reese ................................. 156/240
3,508,754 4/1970 Shorin ................................. 428/352
3,660,196 5/1972 Keeling et al. ...................... 156/240

*Primary Examiner*—Bruce H. Hess
*Attorney, Agent, or Firm*—Fisher, Gerhardt, Crampton & Groh

[57] ABSTRACT

A decal assembly of the type comprising a translucent sheet with indicia thereon and having an adhesive on the back thereof protected by a backing sheet, and a separate blank clear translucent sheet having adhesive on one side and a backing sheet thereover, the separate sheet being dimensionally larger than the indicia carrying sheet and adapted after the backing sheet on both the indicia carrying and blank sheets being peeled off to be placed adhesive to adhesive with the indicia sheet centered on the blank sheet, whereby the blank sheet forms a frame thereabout and the adhesive thereon is adapted to be adhered to the inside of a window and the like, or alternatively only the indicia sheet can be directly adhered on the external side of the window upon its back sheet alone being removed.

8 Claims, 8 Drawing Figures

DECAL ASSEMBLY FOR INSIDE-OUTSIDE APPLICATION HAVING A REFLECTORIZED SURFACE

BACKGROUND OF THE INVENTION

It is realized that various types of decals have been provided heretofore. These have invariably consisted of a pictorial or symbol representation having a press-on adhesive secured to its back side, but none have featured a composite structure such as can be adhered either to the inside or the outside of a window simply by separating the components and rearranging them in a prescribed sequence.

SUMMARY OF THE INVENTION

The invention comprehends the provision of a novel composite decal assembly having sections arranged in a stack such that by peeling them apart they can be reassembled to self-adhere on the inside or the outside of a window or the like.

The invention comprehends making a multi-sheet assembly including a decal having its back side coated with a pressure-sensitive releasable adhesive which adheres to a first plasticized backing sheet to one side of which the adhesive side of the decal is temporarily adhered, the opposite side of the backing sheet being releasably adhered to a second backing sheet which is adhesively coated on its front side, the rear side of the second backing sheet having no adhesive on its back side, both backing sheets being dimensionally in both length and width preferably larger than the decal, so that when both sheets are separated from the decal it may be adhered directly with the adhesive on its back side to an opposing support surface, and alternatively, the two backing sheets may be separated and the adhesive side of the decal centered on the adhesive side of the second backing sheet and adhered thereto, the marginal edge of the second backing sheet providing a tacky margin about the edge of the decal, and may thus be adhered to the internal side of a window.

These and other objects and advantages inherent in an encompassed by the invention are disclosed in the specification and drawings, wherein.

DESCRIPTION OF THE INVENTION

Figure 1:
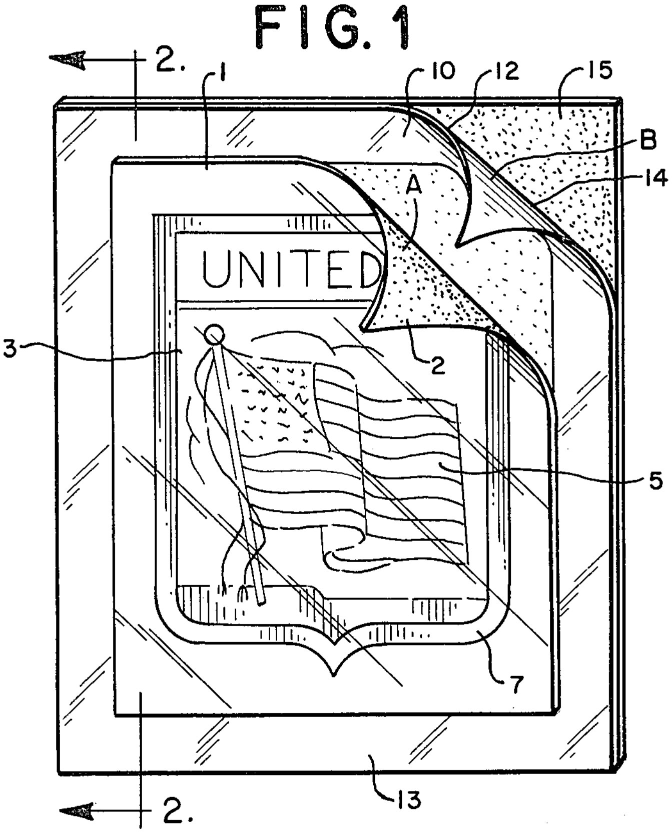
FIG. 1 is a perspective view of the invention showing the sheets partially peeled apart.
Figure 2:
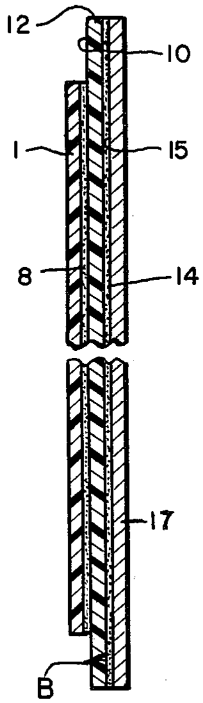
FIG. 2 is a cross-sectional view taken substantially on line 2—2 of FIG. 1.
Figure 3:
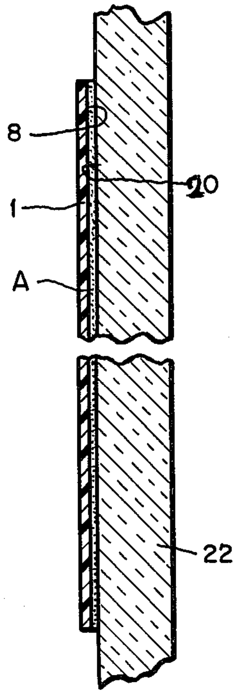
FIG. 3 is a cross-sectional view similar to FIG. 2, showing the mounting of the decal on the outside of a window.

The invention as depicted in the drawings comprises a decal 1 made of reflective aluminum or metal foil 2 which has a swirled reflective face 3 upon which there is imprinted a picture or other indicia 5 which is herein shown as a flag upon a shield 7.

The back side 8 of the decal is provided with a pressure-sensitive adhesive A which is centered on a front face 10 of a first backing sheet 12 which is larger dimensionally lengthwise and widthwise to provide a marginal edge portion 13 forming a peripheral frame about the decal. The front face is covered with a coating of plastic such as polyethylene so that the sheet 12 may easily peel off from the adhesive A.

The rear side 14 of the first backing sheet 12 is provided with pressure sensitive adhesive B which is peelably adhered to the front face 15 of the second backing sheet 17, which is coated with a coating of plastic such as polyethylene. Both sheets are made of paper and the back side of each sheet is porous, uncoated and rough textured so that the adhesive clings thereto.

Figure 4:
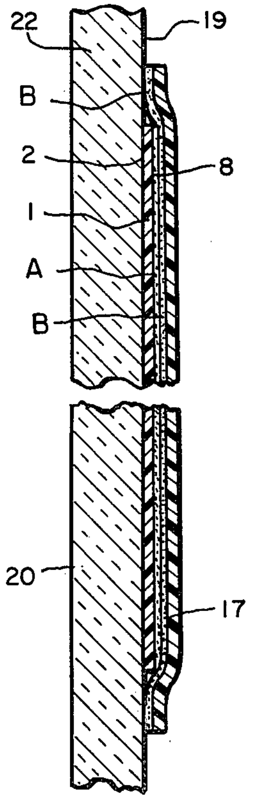
FIG. 4 is a cross-section showing mounting of the decal with the rear backing sheet on the inside of the window.
Figure 5:
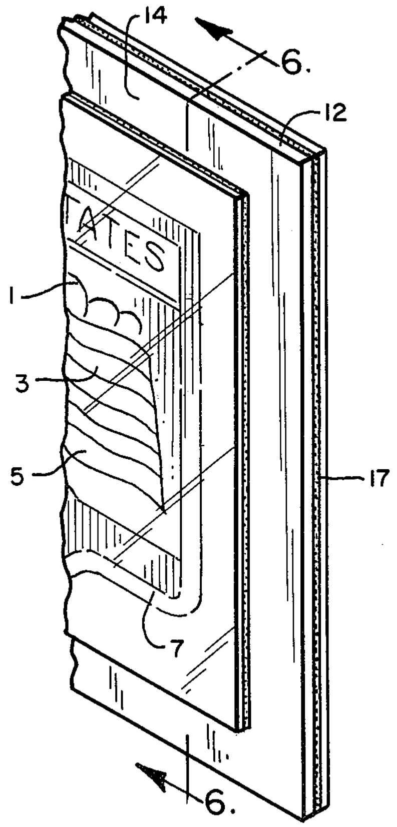
FIG. 5 is a perspective view showing the parts in assembled condition.
Figure 6:
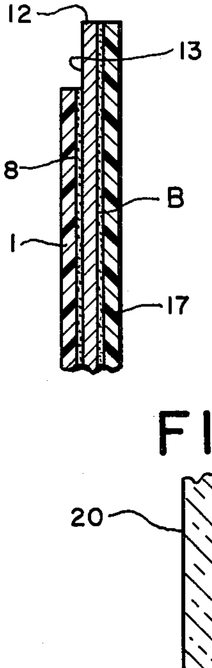
FIG. 6 is a cross-sectional view on line 6—6.
Figure 8:
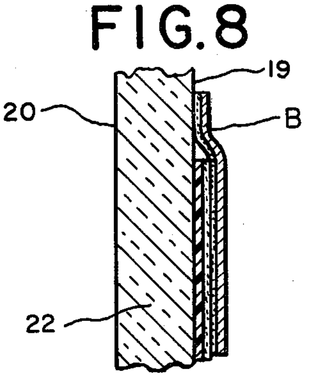
FIG. 8 shows the rear backing sheet adhered to the back of the decal and at its margins adhered to the interior of a window.

In order to mount the decal in both FIGS. 4 and 8 the intermediate or front backing sheet 12, which is of the same size as the rear sheet 17, is stripped off from both the decal and the rear sheet. Sheet 12 is then inverted or rotated 180° and the adhesive B is then adhered to A, care being taken to center the decal on sheet 17. The marginal edge portion 13 of sheet 12 is then pressed toward the window as seen in FIGS. 4 and 8 and the adhesive B is adhered to the internal surface 19 of the window 22.

Figure 7:
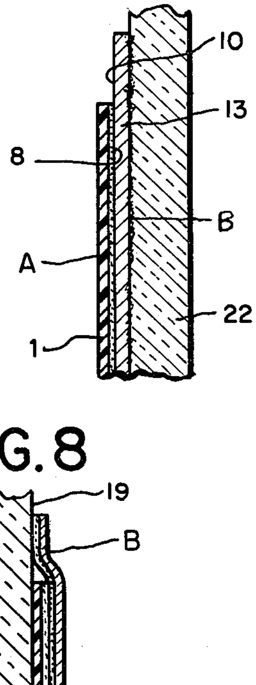
FIG. 7 is a cross-section showing the decal adhered to the backing sheet and the backing sheet adhered to the outside of the window.

FIG. 7 shows an alternative method of external application. In this method the rear sheet 17, which may be translucent plastic, is removed, exposing adhesive B which then is pressed against external surface 20 of the support such as a window.

I claim:

1. A decal assembly for application to face away or toward a transparent support means comprising:

a decal having a front face with indicia thereon and a rear face;

a first pressure-sensitive adhesive on said rear face;

a first sheet having a peelable face adhered to said adhesive;

a second pressure-sensitive adhesive on the rear face of said first sheet;

and a second sheet having a peelable face adhered to said second adhesive, (a) said sheets being larger than said decal and providing a marginal edging therefor, and (b) said second sheet being removable from said second adhesive, and said first sheet being removable from said first adhesive, and said first sheet being invertable and the second adhesive thereon being adhered to said first adhesive in a position on said decal to provide a margin thereabout with the second adhesive positioned to adhere to the interior side of said support means.

2. The assembly according to claim 1 and said decal being peelable off from said peelable face on the first sheet and being adherable to an associated support.

3. The assembly according to claim 1 and said decal being dimensioned lengthwise and widthwise smaller than said backing sheets.

4. The invention according to claim 1 and at least said first sheet being made of paper and the back side thereof being rough textured.

5. The assembly according to claim 1 and said first sheet having its front face coated with a plastic.

6. The assembly according to claim 1 and said second sheet being made of paper and having a front face coated with a plastic.

7. The assembly according to claim 1 and said plastic being polyethylene.

8. The assembly according to claim 1 and said second sheet being made from a translucent plastic.

* * * * *